United States Patent
Schultz

(10) Patent No.: US 8,851,878 B2
(45) Date of Patent: Oct. 7, 2014

(54) FILTER FOR A RESIN VESSEL

(75) Inventor: René Schultz, Kolding (DK)

(73) Assignee: LM Glasfiber A/S, Kolding (DK)

( * ) Notice: Subject to any disclaimer, the term of this patent is extended or adjusted under 35 U.S.C. 154(b) by 490 days.

(21) Appl. No.: 12/934,729

(22) PCT Filed: Mar. 27, 2009

(86) PCT No.: PCT/EP2009/053645
§ 371 (c)(1),
(2), (4) Date: Dec. 10, 2010

(87) PCT Pub. No.: WO2009/118403
PCT Pub. Date: Oct. 1, 2009

(65) Prior Publication Data
US 2011/0104323 A1 May 5, 2011

(30) Foreign Application Priority Data

Mar. 28, 2008 (EP) ..................................... 08388013

(51) Int. Cl.
*B01D 53/04* (2006.01)
*B29C 43/12* (2006.01)
*B01D 5/00* (2006.01)

(52) U.S. Cl.
CPC ................. *B01D 53/04* (2013.01); *B29C 43/12* (2013.01); *B01D 2257/80* (2013.01); *B01D 5/0027* (2013.01); *B01D 2259/4146* (2013.01); *B01D 2253/102* (2013.01); *B01D 2257/7027* (2013.01); *B01D 5/0069* (2013.01); *B01D 53/0415* (2013.01); *B01D 2253/106* (2013.01)
USPC .......................................................... 425/388

(58) Field of Classification Search
CPC ..... B01D 5/0069; B01D 5/0027; B29C 43/12
USPC .............................................. 425/388; 3/388
See application file for complete search history.

(56) References Cited

U.S. PATENT DOCUMENTS

| 4,231,768 | A | * | 11/1980 | Seibert et al. .................... 96/128 |
| 5,141,533 | A | * | 8/1992 | Sowinski ......................... 95/147 |
| 5,922,105 | A | | 7/1999 | Fujii et al. |
| 2004/0157519 | A1 | | 8/2004 | Goodell et al. |

FOREIGN PATENT DOCUMENTS

| EP | 1 880 833 A1 | 1/2008 |
| GB | 2 432 336 A | 5/2007 |

\* cited by examiner

*Primary Examiner* — Robert J Grun
(74) *Attorney, Agent, or Firm* — Nath, Goldberg & Meyer; Jerald L. Meyer; Sanjana Mangalagiri

(57) ABSTRACT

A resin vessel including a sealed container (31) having an inlet (36) and an outlet (40) as well as a bottom surface (33) is described. The resin vessel further includes a filter device (60). The filter device (60) includes a housing (61) having a first end (62) and a second end (64). When seen from the first end (62) towards the second end (64), the filter device (60) includes: a first demister layer (66) having a first end (68) and a second end (70) and having a first thickness, a second layer (72) having a first end (74) and a second end (76) and having a second thickness and comprising silica, and a third layer (78) having a first end (80) and a second end (82) and having a third thickness and including activated carbon, the layers (66, 72, 78) of the filter device being arranged within the housing (61). The filter device (60) further includes: an inlet (84) for receiving a gaseous fluid provided at the first end (62) of the housing (61), and an outlet (86) for emitting the gaseous fluid after having passed the layers (66, 72, 78) of the filter device (60), the outlet (86) being provided at the second end (64) of the housing (60). The outlet (86) of the filter device (60) is connected to the outlet (40) of the sealed container (31) so that the inlet (84) of the filter device (60) is located at a distance from the bottom surface (33) of the sealed container (31).

18 Claims, 4 Drawing Sheets

FILTER FOR A RESIN VESSEL

CROSS-REFERENCE TO PRIOR APPLICATIONS

This is a National Phase Application filed under 35 USC 371 of International Application No. PCT/EP2009/053645, filed on Mar. 27, 2009, an application claiming foreign priority benefits under 35 USC 119 of European Application No. 08388013.8, filed on Mar. 28, 2008, the content of each of which is hereby incorporated by reference in its entirety.

TECHNICAL FIELD

The present invention relates to a sealed container having an inlet and an outlet as well as a bottom surface. The invention further relates to an apparatus for evacuating a mould cavity in a vacuum assisted resin transfer moulding (VARTM) process as well as a VARTM system comprising such an apparatus. Furthermore, the invention relates to a method of evacuating a mould cavity in a VARTM process.

BACKGROUND

Vacuum infusion or VARTM is a process used for moulding fibre composite mouldings, where uniformly distributed fibres are layered in a first mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material. By generating a vacuum, typically 80 to 95% of the total vacuum, in the mould cavity between the inner side of the first mould part and the vacuum bag, the liquid polymer or resin can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester, vinyl ester or epoxy, and the fibre reinforcement is most often based on glass fibres or carbon fibres, but may also be plastic fibres, plant fibres or metal fibres.

During the process of filling the mould, a vacuum, said vacuum in this connection being understood as an under-pressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity.

In order to obtain an efficient evacuation of the mould cavity, the vacuum channels are connected to a vacuum source, such as a compressor or a vacuum pump. The vacuum channels are often connected to the vacuum source via a resin vessel or overflow bucket, so that resin, which is inadvertently sucked into the vacuum channels is spilled into the resin vessel without damaging the vacuum source. Typically a number of resin vessels are used for the evacuation process and/or the impregnation process, the number of resin vessels depending on the size of the composite structure to be manufactured.

The resin vessels may be provided with different valves and electronic equipment, such as a pressure sensor to monitor the vacuum level of the mould cavity and a resin level transmitter for measuring the amount of resin spilled into the resin vessel. Thus, the evacuation process and/or the impregnation process can be monitored closely. The valves and electronic equipment are usually disposed on top of the resin vessel, e.g. on a removable lid.

However, it has been found that a green fluid is generated, when water is mixed with the polyester resin and the resin starts hardening in the resin vessel. In the process, the water boils up and a gaseous fluid is generated, which disposes itself as a green liquid, clogging up the valves and electronic equipment disposed on top of the resin vessel. The green liquid comprises styrene and water. Consequently, the valves and electronic equipment, which are often quite expensive, will in time have to be exchanged due to the styrene and water clogging up the equipment.

U.S. Pat. No. 5,141,533 (D1) describes a method of filtering, at the end user's home, business or the like, a gas stream in which benzo-a-pyrene has been concentrated at sufficient levels to be a significant health hazard. The filter comprises a first layer with pleated filter paper, a second layer comprising a silica gel, and a third layer with active coal. Additionally, a fourth layer is arranged between the second and the third layers.

U.S. Pat. No. 5,922,105 (D2) describes a class 10,000 clean room. Air entering the cleanroom is first passed through a pre-filter and an air conditioner after which the air is deprived of dust particles via a HEPA-filter. Air within the clean room is first dehumidified via an electronic dehumidifier. The dehumidified air is then run through a HC adsorbent apparatus which may comprise a layer of silica gel and a layer of active charcoal.

GB2432336 (D3) a mould system for use in a light Resin Transfer Moulding (RTM) process. The mould system comprises a catch-pot for capturing excess resin.

US2004/157519 (D4) describes a RTM mould system. In one embodiment, a vacuum pump is used for initially collapsing a bag via a vacuum line. During a subsequent pressurised infusion process, the vacuum line is used as a drain line for draining excess resin to a pot.

DISCLOSURE OF THE INVENTION

The purpose of the present invention is to provide a new and improved filter device, which alleviates the above mentioned problems.

According to a first aspect of the invention is achieved by resin vessel further comprising a filter device, which comprises a housing having a first end and a second end, wherein the filter device, when seen from the first end towards the second end, comprises: a first demister layer having a first end and a second end and having a first thickness, a second layer having a first end and a second end and having a second thickness and comprising silica, and a third layer having a first end and a second end and having a third thickness and comprising activated carbon, the layers of the filter device being arranged within the housing, and wherein the filter device further comprises: an inlet for receiving a gaseous fluid provided at the first end of the housing, and an outlet for emitting the gaseous fluid after having passed the layers of the filter device, the outlet being provided at the second end of the housing, and wherein the outlet of the filter device is connected to the outlet of the sealed container so that the inlet of the filter device is located at a distance from the bottom surface of the sealed container.

Thus, the filter device comprises, seen from the first end, first the first demister layer, then the second layer followed by the third layer. The demister layer is used to condensing the fluid and/or collecting big droplets of styrene and water so that the second layer and third layer are not saturated too quickly. The second layer comprising silica is used to adsorb remaining moist from the fluid, and finally the third layer comprising activated carbon, adsorbs remaining particles, such as styrene particles, from the fluid. This combination has proved to be particularly suited for used for resin vessels in VARTM processes. Activated carbon is also called activated charcoal or activated coal, and for all three variations of the name, "activated" is sometimes substituted by "active". The activated carbon may for instance be in powdered or granulated form.

By letting the filter device being connected to the outlet of the sealed container in such a way that the inlet of the filter device is located at a distance from the bottom surface of the sealed container, it is ensured that the resin, which has spilled in to the sealed container does not come in contact with and saturates the different layers of the filter device.

Advantageously, the outlet of the sealed container is also located at a distance from the bottom of the sealed container so that resin spilled into the sealed container—with or without the filter device—is not inadvertently sucked into the outlet of the sealed container and onto a vacuum source connected to said outlet. The inlet of the sealed container is also advantageously located in a distance from the bottom of the sealed container so that resin can spill into the sealed container and not flow back into the inlet.

It is clear that the filter device does not have to be longitudinally extending but may be curved so that the first end (and the inlet) and the second end (and the outlet) being provided at opposites ends of a curved or bent filter device.

According to a broader aspect, the invention provides a filter device for a resin vessel, wherein the filter device comprises a housing having a first end and a second end, wherein the filter device, when seen from the first end towards the second end, comprises: a first demister layer having a first end and a second end and having a first thickness, a second layer having a first end and a second end and having a second thickness and comprising silica, and a third layer having a first end and a second end and having a third thickness and comprising activated carbon, the layers of the filter device being arranged within the housing, and wherein the filter device further comprises: an inlet for receiving a gaseous fluid provided at the first end of the housing, and an outlet for emitting the gaseous fluid after having passed the layers of the filter device, the outlet being provided at the second end of the housing.

In the following a number of embodiments relating to both the first aspect of the invention, i.e. the resin vessel, and the broader aspect of the invention, i.e. the filter device itself, are described.

According to a preferred embodiment, the second layer comprises a silica gel, i.e. the silica of the second layer is in the form of a gel, which is particularly suitable for adsorbing moist from a fluid.

According to an advantageous embodiment, the demister layer comprises a steel wool material, which is particularly suited for collecting droplets from a fluid and condensing a gaseous fluid.

According to another advantageous embodiment, the sealed container comprises a container part with an opening and a detachable lid sealed to the opening. The lid can for instance be sealed to the container part via a sealing ring and a fastening clamp. Thus, the lid can be removed from the container, and the resin, which has been collected in the container part can subsequently be poured out for disposal.

According to yet another advantageous embodiment, the inlet and/or the outlet of the sealed container is connected to the sealed container through the lid. Thereby, all the sensors connected to the resin vessel, inlets, and outlets can together be removed from the container part, thereby making it easier to empty the resin from the container part. Furthermore, this provides easy access to the filter device so that it readily may be exchanged According to an advantageous embodiment, the inlet of the filter device faces towards the bottom surface of the sealed container. This provides a simple design for collecting a gaseous fluid emitted from resin spilled into the sealed container.

According to a first embodiment, the first thickness is between 10 and 60 mm, or between 15 and 55 mm, or between 25 and 50 mm, such as 10, 15, 20, 25, 30, 35, 40, 45, 50, 55, or 60 mm. According to another embodiment, the second thickness and/or the third thickness is between 10 and 50 mm, or between 15 and 45 mm, or between 20 and 40 mm, such as 10, 15, 20, 25, 30, 35, 40, 45, or 50 mm. These layer thicknesses have proved to be particularly suited for the resin vessel for use in the VARTM process and ensuring a lifetime of a few months for the filter device before having to be exchanged.

According to an alternative embodiment, the sum of the first thickness, the second thickness, and the third thickness equals a total thickness, the first thickness being between 30 and 50% of the total thickness, the second thickness being between 20 and 40% of the total thickness, and the third thickness being between 20 and 40% of the total thickness.

In one embodiment according to the invention, the layers have the same cross section, e.g. so sides of the various layers are mutually flushing. However, this needs not be the case, and embodiments, where the housing is tapered from the first end to the second end, or where the cross section of the housing is decreased and/or increased between layers are also contemplated.

In a first embodiment according to the invention, a first, preferably removable, plate having first holes with a maximum inner dimension is provided at the first end of the demister layer. The plate can be a perforated plate, or provided with circular holes. Accordingly, a number of the droplets having a dimension being larger than the maximum inner dimension of the first holes may be prevented from entering the filter device and possibly fall back into the resin vessel without saturating any of the other layers of the filter device.

The maximum inner dimension of the first holes may be between 1 and 10 mm, or between 2 and 8 mm, or between 3 and 7 mm. In one embodiment the maximum inner dimension is approximately 5 mm.

In another embodiment, a second, preferably, removable plate having second holes with a maximum inner dimension is provided between the second end of the demister layer and the first end of the second layer. In yet another embodiment, a third, preferably removable, plate having third holes with a maximum inner dimension is provided at the second end of the third layer. These perforated plates may also prevent droplets of a given size to pass these plates into the other layers or through the outlet of the filter device. It would also to possible to provide such a hole plate between the second end of the second layer and the first end of the third layer.

The maximum inner dimension of the second holes and/or third holes may be between 0.5 and 5 mm, or between 0.8 mm and 4 mm, or between 1 and 3 mm. In one embodiment the maximum inner dimension is approximately 2 mm.

According to an advantageous embodiment, the housing is provided with a connection piece, e.g. projecting from the second end. Thereby, the filter device can easily be installed or removed from for instance a resin vessel.

According to another advantageous embodiment, the connection piece is provided with an inner or outer thread, preferably an outer thread. Thereby, a simple way of exchanging the filter device is provided, since the resin vessel only has to be provided with a connection piece having a corresponding thread, i.e. preferably an inner thread. Thus, the outlet of the sealed container may for instance be provided as a tube with an inner thread for connecting the filter device. However, the filter device may also be provided inside the outlet or otherwise be part of the resin vessel itself.

According to a second aspect, the invention provides an apparatus for evacuating a mould cavity in a VARTM process, the apparatus comprising resin vessel according to any of the afore-mentioned embodiments, wherein the outlet of the sealed container is connected to a vacuum source.

The apparatus may also contain an additional inlet, thereby being able to be connected to additional vacuum outlets during the VARTM process. The apparatus may also contain additional outlets. Furthermore, a single vacuum source, such as a compressor or vacuum pump, may be connected to more than one apparatus.

According to a third aspect, the invention provides a vacuum assisted resin transfer moulding system comprising a mould having a mould cavity and an apparatus according to the second aspect of the invention, wherein the inlet of the sealed container is connected to the mould cavity. The mould may comprise a rigid mould part, a flexible mould part for sealing against the rigid mould part, and a number of apparatuses according to the second aspect of the invention.

According to a fourth aspect, the invention provides a method of evacuating a mould cavity in a vacuum assisted resin transfer system, wherein an evacuated gaseous fluid is filtered by: a) first passing the gaseous fluid through a demister layer, then b) passing the gaseous fluid through a layer comprising a silica material, such as a silica gel, and then c) passing the gaseous fluid through a layer comprising activated carbon.

Furthermore, the method may also involve passing the fluid through a number of perforated plates as previously described.

BRIEF DESCRIPTION OF THE DRAWINGS

The invention is explained in detail below with reference to an embodiment shown in the drawings, in which.

DETAILED DESCRIPTION OF THE INVENTION

Figure 1:
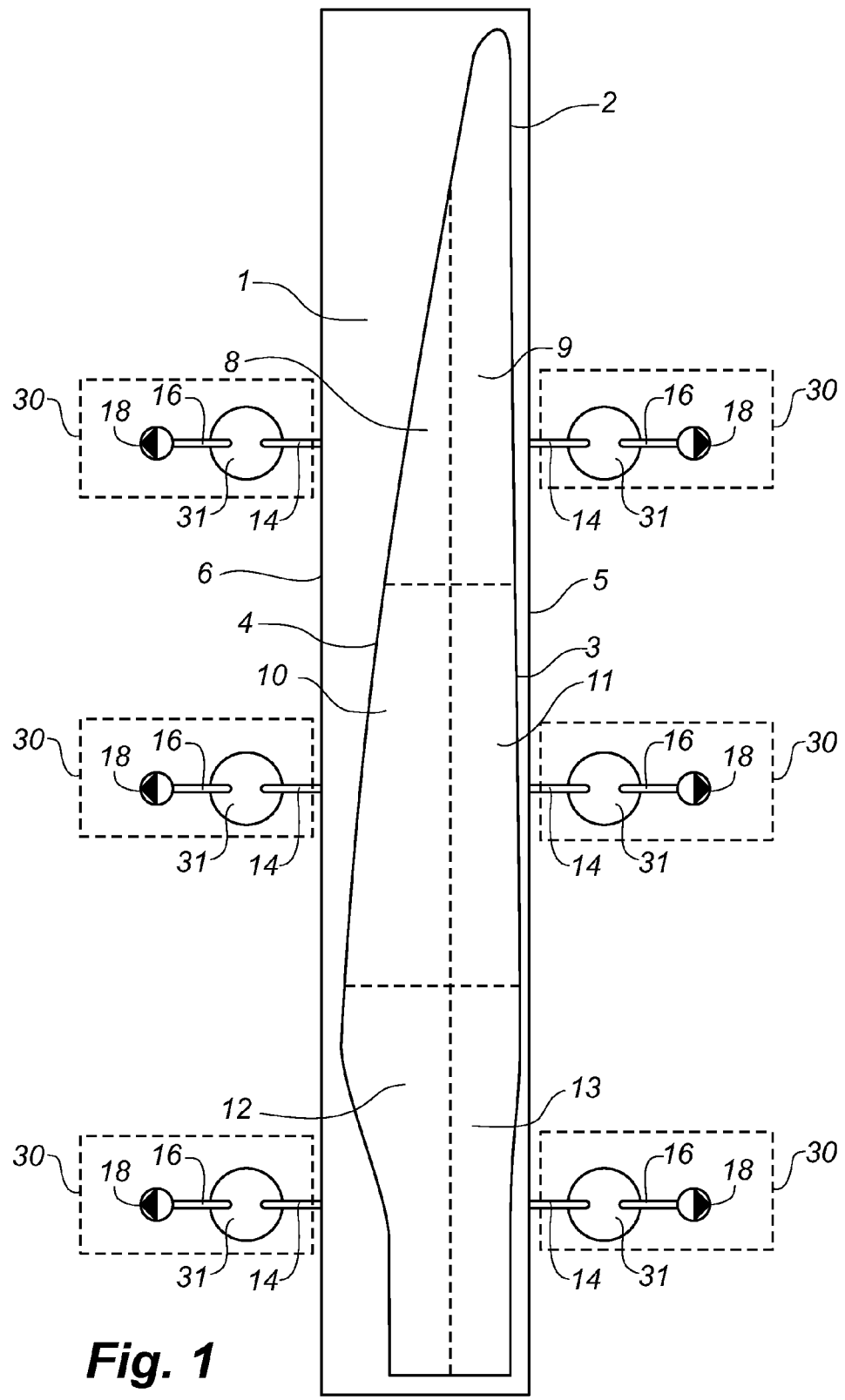
FIG. 1 shows a mould for manufacturing a wind turbine blade shell part.

FIG. 1 shows a solid mould part 1 seen from above. The mould part 1 has a moulding surface, which is the negative of the outer surface of a blade shell part 2. The blade shell part 2 has a leading edge 3 and a trailing edge 4. The mould part 1 comprises a first side rim 5 and a second side rim 6. The blade shell half 2 is manufactured via a VARTM process, where a fibre insertion or another fibre material is arranged in a mould cavity. The mould cavity is evacuated via a number of apparatuses 30, each comprising a first inlet 14, a first outlet 16, a resin vessel according to the invention with a sealed container 31, and a vacuum source 18. By distributing the apparatuses 30 evenly around the mould cavity, each apparatus effectively evacuates a separate part of the entire mould cavity. Consequently, the mould cavity is divided into a number of separate mould cavity parts 8-13, which can be monitored individually.

Figure 2:
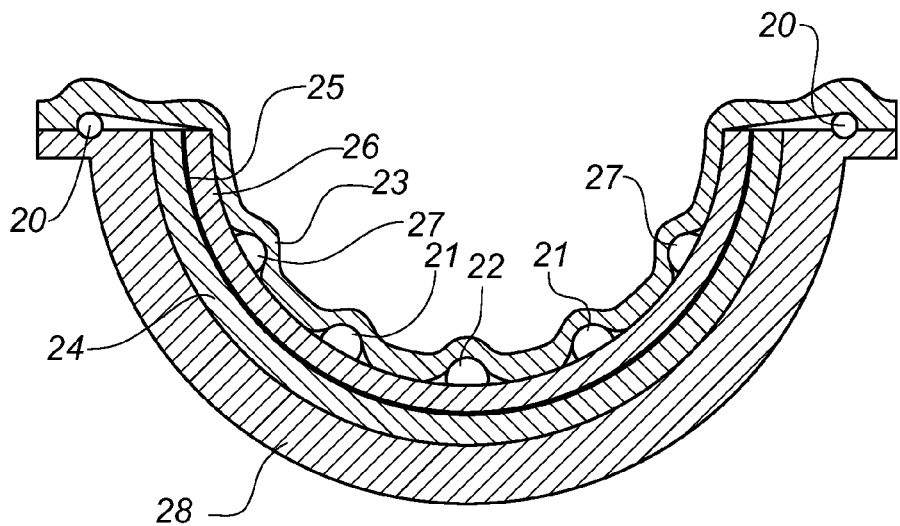
FIG. 2 shows a sectional view through a mould for the manufacturing of a blade shell part.

FIG. 2 shows a sectional view through a mould for the production of a blade shell part for a blade of a wind turbine by vacuum infusion and shows a solid or rigid mould part 1 with a top side mating to the exterior top side of the completed blade shell half. A fibre insertion 24 of for example glass fibre or carbon fibre is placed on the inner top side of the solid mould part 1. This layer can also be a sandwich structure comprising a core material, such as foamed polymer or balsa wood, covered by fibre layers, and can also comprise a longitudinally extending reinforcement section called a main laminate as described in for instance WO 06/058540 by the present applicant.

On top of the fibre insertion 24, a tear-off layer 25 or peel ply is placed which can be a net or a perforated film, and on top of the tear-off layer 25 a distribution net or a flow layer 26 is placed. On top of the distribution net/flow layer 26 a plurality of Ω-shaped inlet profile bodies 21, 22, 27 are placed, said bodies including a longitudinal slot facing the distribution net 26. On top hereof an air-tight vacuum bag 23 is placed. At the flanges of the mould, vacuum channels are provided in the form of perforated vacuum tubes 20.

The vacuum tubes 20 communicate with an apparatus 30, and the inlet profile bodies 21, 22, 27 communicate with a polymer source with liquid polymer. The vacuum in the vacuum channels 20 generate a vacuum in a mould cavity formed between the solid mould part 1 and the vacuum bag 23, and thus polymer is drawn or sucked through the inlet profile bodies 21, 22, 27 downwards into the distribution net 26 and along said distribution net 26 through the tear-off layer 25, as it spreads and impregnates the fibre insertion 24. Upon the completion of curing, the vacuum bag 23, the inlet profile bodies and the distribution net 26 are removed by means of the tear-off layer 25.

Figure 3:
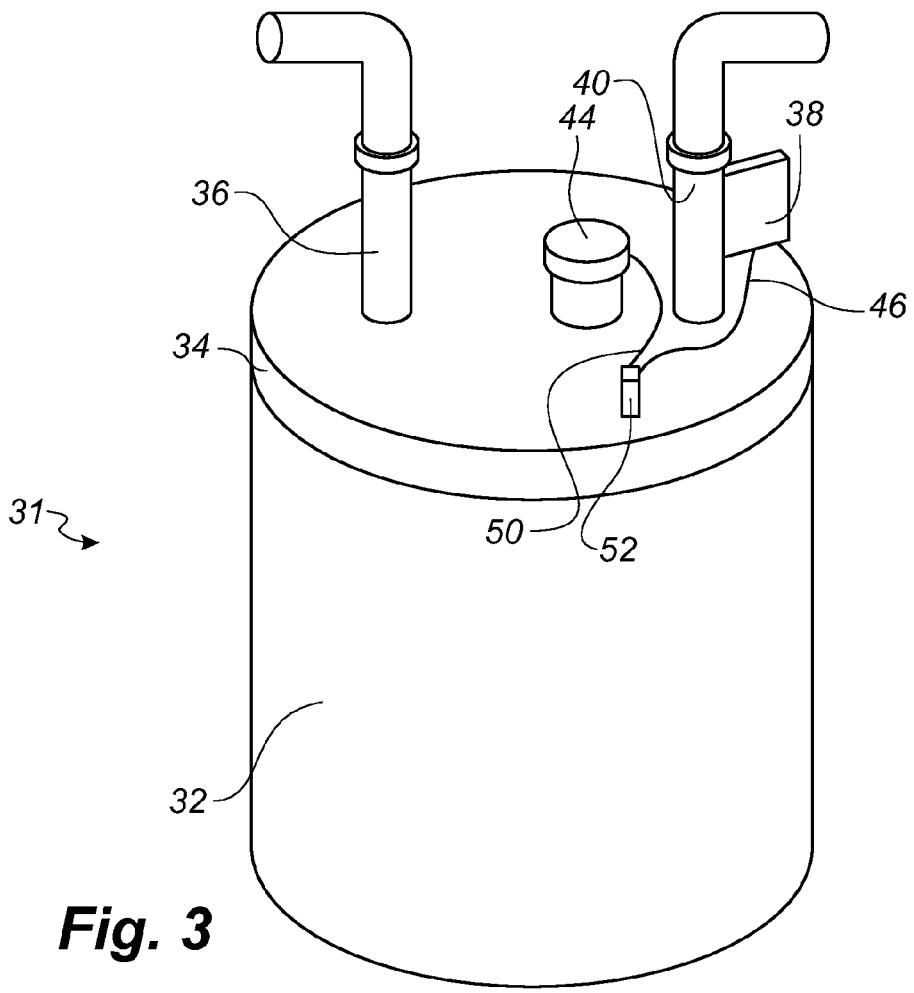
FIG. 3 shows a sealed container according to the invention for use in a VARTM process.
Figure 4:
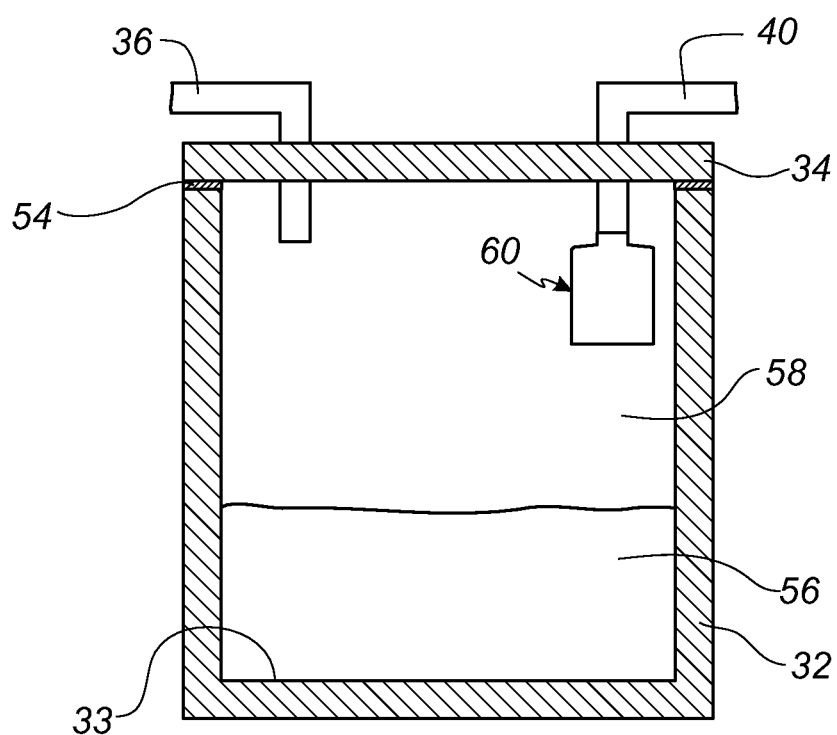
FIG. 4 shows a sectional view through the resin vessel according to the invention.

FIG. 3 shows a schematic view of part of the apparatus 30 according to the invention, seen in perspective. The apparatus 30 comprises a resin vessel with a sealed container 31, which in turn comprises a container part 32 and a lid 34, which is sealed to the container part 32. FIG. 4 shows a cross section of the resin vessel according to the invention, where—for the sake of clarity—some of the parts shown in FIG. 3 have been removed. The lid 34 may for instance be sealed to the container part 32 via a sealing ring 54 and a fastening clamp.

A first inlet tube 36 is connected through the lid 34 so that the inlet tube 36 can communicate with an interior 58 of the sealed container 31. Furthermore, a first outlet tube 40 is connected through the lid 34 so that the outlet tube 40 can communicate with the interior 58 of the sealed container 31. The inlet tube 36 is connected to the mould cavity and the outlet tube 40 is connected to a vacuum source or compressor 18. A first sensor 38, such as a pressure sensor, is connected to the outlet tube 40 in order to measure for instance the pressure in the interior 58 of the container 31. Thereby, it is possible to monitor the vacuum level in the interior 58 of the sealed container 31 and consequently the vacuum level of the mould cavity or the individual mould cavity sections 8-13.

Furthermore, the lid 34 may comprise a level transducer 44 for measuring the level of resin 56, which has inadvertently been sucked into the vacuum channel and spilled into the resin vessel, and thereby the volume of the resin 56 inside the container part 32. Thereby, the operator can easily calculate the quantity or weight of the resin impregnating the composite structure by subtracting the amount or resin in the interior 58 of the sealed containers 31 from the amount of resin supplied to the mould cavity. Thereby, it is easier to control the weight of the finished composite structure and to determine when to stop the filling process before curing the composite structure.

The first sensor 38 and the level transducer 44 are connected via wires 46, 50 to a connecter 52, which for instance can be connected to a computer for monitoring the various parameters of the VARTM process. The sensors or transducers can for instance be 4-20 mA circuits.

However, it has been found that a green fluid is generated, when water is mixed with the polyester resin 56 and the resin 56 starts hardening in the resin vessel. In the process, the water boils up and a gaseous fluid is generated, which disposes itself as a green liquid comprising styrene and water, clogging up the valves and electronic equipment disposed on top of the resin vessel and especially the equipment arranged along the outlet tube 40 of the resin vessel. Consequently, the valves and electronic equipment, which are often quite expensive, will in time have to be exchanged due to the effect from the green liquid. Therefore, a filter device according to the invention has been provided on the outlet tube 40 in order to filter the gaseous fluid and protect the equipment arranged along the outlet tube 40.

Figure 5:
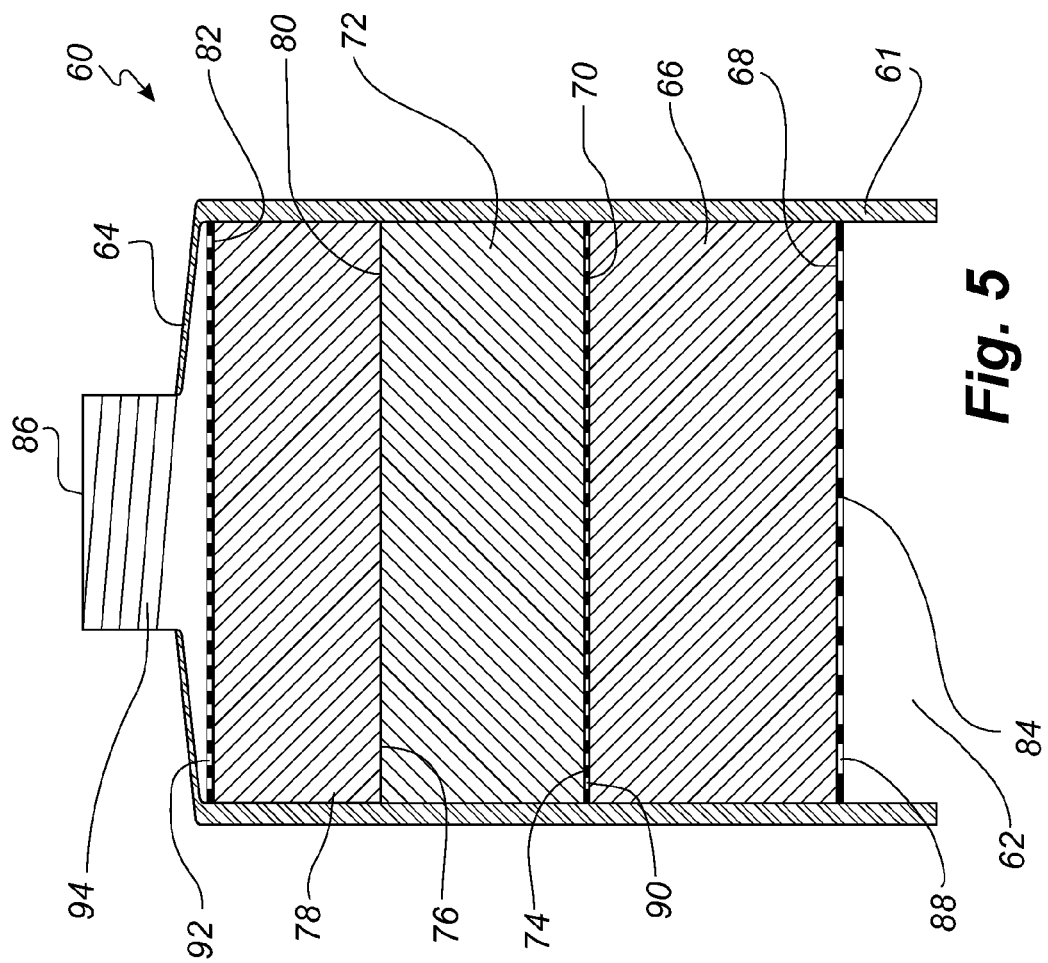
FIG. 5 shows a partial cut through the filter according to the invention.

As shown in FIG. 5, the filter device 60 comprises a housing 61 having an inlet 84 provided at a first end 62 of the housing 60 and an outlet 86 provided at a second end 64 of the housing 64. The filter device further comprises a first demister layer 66 comprising steel wool and having a first end 68 and a second end 70, a second layer 72 of silica gel having a first end 74 and a second end 76, and a third layer 78 of activated carbon having a first end 80 and a second end 82. The filter device 60 is connected to the outlet 40 of the sealed container 31 in such a way that the first end 62 and the inlet 84 of the filter device 62 is located in a distance from and facing towards a bottom surface 33 of the sealed container 31. Thereby, it is ensured that the resin 56, which has spilled in to the sealed container does not come in contact with and saturates the different layers of the filter device 60.

A first removable plate 88 having circular holes with a first diameter is provided at the first end 68 of the demister layer 66. A second removable plate 90 having circular holes with a second diameter is provided between the second end 70 of the demister layer 66 and the first end 74 of the second layer 72. A third removable plate 92 having circular holes with a third diameter is provided at the second end 82 of the third layer 78.

Figure 6:
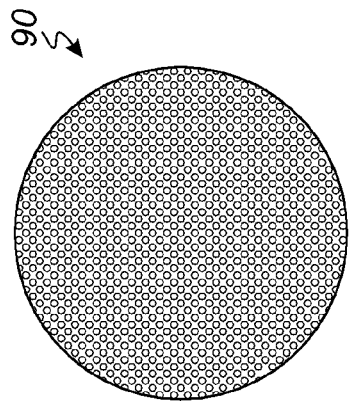
FIG. 6 shows a schematic view of a first embodiment of a perforated plate.
Figure 7:
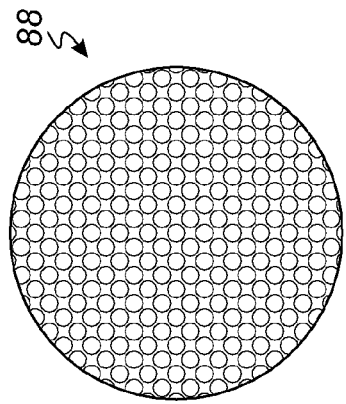
FIG. 7 shows a schematic view of a second embodiment of a perforated plate.

The second end 76 of the second layer 72 abuts the first end 80 of the third layer 78. The first plate 88 is depicted from above in FIG. 7, and the second plate 90 is depicted from above in FIG. 6.

A connection piece 94 with an outer thread is provided at the second end 64 of the housing 61. The connection tube 40 is accordingly provided with an inner thread so that the filter device 60 can be connected to the connection tube 40.

When the gaseous fluid comprising styrene and water is sucked into the outlet tube 40, the gaseous fluid must first pass through the layers of the filter device 60. The demister layer 66 comprising steel wool condenses the gaseous fluid and adsorbs big droplets of water and styrene, which thereby may fall back into the interior 58 of the resin vessel. Thus, the demister layer prevents the silica gel and activated carbon from being saturated too quickly. The second layer 72 of silica gel adsorbs a majority of the remaining moisture from the gaseous fluid, whereas the third layer 78 of activated carbon adsorbs the remaining styrene and possibly other particles from the gaseous fluid. The removable plates 88, 90, 92 prevents droplet of a given size from passing through the holes.

The filter device 60 prevents expensive equipment electronic equipment and valves arranged at the outlet 40 of the resin vessel from clogging up and prolongs the lifetime of such equipment substantially. The filter device 60 can be manufactured at low cost and is easily exchanged. A filter device 60 according to the following example can approximately be used fifty times, e.g. for the production of fifty wind turbine blade shell parts, before having to be exchanged

EXAMPLE

According to one example, the thickness of the first layer is 40 mm, the thickness of the silica gel layer is 30 mm, and the thickness of the activated carbon layer is 30 mm, whereas the first diameter of the removable plates is 5 mm, and the second and third diameter of the removable plates are 2 mm.

The invention has been described with reference to a preferred embodiment. However, the scope of the invention is not limited to the illustrated embodiment, and alterations and modifications can be carried out without deviating from the scope of the invention. For instance, the hole plates may be perforated with elongated holes. Also, the different layers of the filter device may be provided in the outlet tube itself. Furthermore, additional filter devices may be provided in the resin vessel.

LIST OF REFERENCE NUMERALS 1 mould part
2 wind turbine blade shell part
3 leading edge
4 trailing edge
5 first rim
6 second rim
8-13 mould cavity parts
14 first inlet
16 first outlet
18 vacuum source/compressor
20 vacuum channels
21 resin inlet channels/vacuum channels
22 resin inlet channel/vacuum channel
23 vacuum bag
24 fibre material
25 tear-off layer/peel ply
26 distribution net
27 resin inlet channels/vacuum channels
28 solid mould part
30 apparatus
31 sealed container
32 container part
33 bottom surface
34 lid
36 inlet tube
38 mass flow sensor
40 outlet tube
42 pressure transducer
44 resin level sensor/transducer 46, 48, 50 wire
52 output/connector
54 sealing ring
56 resin
58 interior
60 filter device
61 housing
62 first end
64 second end
66 demister layer
68 first end of demister layer
70 second end of demister layer
72 second layer
74 first end of second layer
76 second end of second layer
78 third layer
80 first end of third layer
82 second end of third layer
84 inlet
86 outlet
88 first plate
90 second plate
92 third plate
94 connection piece

The invention claimed is:

1. A resin vessel comprising a sealed container (31) having a lid (34), an inlet (36) and an outlet (40) as well as a bottom surface (33), characterized in that the resin vessel further comprises a filter device (60), which comprises a housing (61) having a first end (62) and a second end (64), wherein the filter device (60), when seen from the first end (62) towards the second end (64), comprises:
    a first demister layer (66) having a first end (68) and a second end (70) and having a first thickness,
    a second layer (72) having a first end (74) and a second end (76) and having a second thickness and comprising silica, and
    a third layer (78) having a first end (80) and a second end (82) and having a third thickness and comprising activated carbon, the layers (66, 72, 78) of the filter device being arranged within the housing (61), and wherein the filter device (60) further comprises:
    an inlet (84) for receiving a gaseous fluid provided at the first end (62) of the housing (61), and
    an outlet (86) for emitting the gaseous fluid after having passed the layers (66, 72, 78) of the filter device (60), the outlet (86) being provided at the second end (64) of the housing (60), and wherein the outlet (86) of the filter device (60) is only connected to the outlet (40) of the sealed container (31) so that the inlet (84) of the filter device (60) is located at a distance away from the bottom surface (33) of the sealed container (31).

2. A resin vessel according to claim 1, wherein the second layer comprises a silica gel.

3. A resin vessel according to claim 1, wherein the demister layer comprises a steel wool material.

4. A resin vessel according to claim 1, wherein the sealed container (31) comprises a container part (32) with an opening and a detachable lid (34) sealed to the opening.

5. A resin vessel according to claim 4, wherein the inlet (36) and/or the outlet (40) of the sealed container (31) is connected to the sealed container (31) through the lid (34).

6. A resin vessel according to claim 1, wherein the inlet (84) of the filter device (60) faces towards the bottom surface (33) of the sealed container (31).

7. A resin vessel according to claim 1, wherein the first thickness is between 10 and 60 mm, or between 15 and 55 mm, or between 25 and 50 mm.

8. A resin vessel according to claim 1, wherein the second thickness and/or the third thickness is between 10 and 50 mm, or between 15 and 45 mm, or between 20 and 40 mm.

9. A resin vessel according to claim 1, wherein a first, preferably removable, plate (88) having first holes with a maximum inner dimension is provided at the first end of the demister layer.

10. A resin vessel according to claim 9, wherein the maximum inner dimension of the first holes is between 1 and 10 mm, or between 2 and 8 mm, or between 3 and 7 mm.

11. A resin vessel according to claim 1, wherein a second, preferably removable plate (90) having second holes with a maximum inner dimension is provided between the second end of the demister layer and the first end of the second layer.

12. A resin vessel according to claim 1, wherein a third, preferably removable, plate (92) having third holes with a maximum inner dimension is provided at the second end of the third layer.

13. A resin vessel according to claim 11, wherein the maximum inner dimension of the second holes and/or third holes is between 0.5 and 5 mm, or between 0.8 mm and 4 mm, or between 1 and 3 mm.

14. A resin vessel according to claim 1, wherein the housing is provided with a connection piece (94), e.g. projecting from the second end (64).

15. A resin vessel according to claim 14, wherein the connection piece is provided with an inner or outer thread, preferably an outer thread.

16. An apparatus for evacuating a mould cavity in a vacuum assisted resin transfer moulding process, the apparatus comprising resin vessel according to claim 1, wherein the outlet (40) of the sealed container (31) is connected to a vacuum source (18).

17. A vacuum assisted resin transfer moulding system comprising a mould having a mould cavity and an apparatus according to claim 16, wherein the inlet (36) of the sealed container (31) is connected to the mould cavity.

18. A vacuum assisted resin transfer moulding system comprising a mould having a mould cavity, wherein the inlet (36) of the sealed container (31) is connected to the mould cavity, and wherein the mould comprises a rigid mould part, a flexible mould part for sealing against the rigid mould part, and a number of apparatuses according to claim 16.

* * * * *